US010375410B2

(12) United States Patent
Andrivon et al.

(10) Patent No.: US 10,375,410 B2
(45) Date of Patent: Aug. 6, 2019

(54) METHOD FOR COLOR MAPPING A VIDEO SIGNAL BASED ON COLOR MAPPING DATA AND METHOD OF ENCODING A VIDEO SIGNAL AND COLOR MAPPING DATA AND CORRESPONDING DEVICES

(71) Applicant: THOMSON LICENSING, Issy les Moulineaux (FR)

(72) Inventors: Pierre Andrivon, Liffre (FR); Sebastien Lasserre, Thorigné Fouillard (FR); Philippe Bordes, Laille (FR)

(73) Assignee: InterDigital VC Holdings, Inc., Wilmington, DE (US)

( * ) Notice: Subject to any disclaimer, the term of this patent is extended or adjusted under 35 U.S.C. 154(b) by 144 days.

(21) Appl. No.: 15/518,233

(22) PCT Filed: Oct. 1, 2015

(86) PCT No.: PCT/EP2015/072725
§ 371 (c)(1),
(2) Date: Apr. 10, 2017

(87) PCT Pub. No.: WO2016/058835
PCT Pub. Date: Apr. 21, 2016

(65) Prior Publication Data
US 2017/0302946 A1    Oct. 19, 2017

(30) Foreign Application Priority Data
Oct. 17, 2014    (EP) .................................. 14306650

(51) Int. Cl.
*G06K 9/00*    (2006.01)
*H04N 19/46*    (2014.01)
(Continued)

(52) U.S. Cl.
CPC .............. *H04N 19/46* (2014.11); *G09G 5/02* (2013.01); *H04N 1/6058* (2013.01); *H04N 9/67* (2013.01);
(Continued)

(58) Field of Classification Search
None
See application file for complete search history.

(56) References Cited

U.S. PATENT DOCUMENTS 5,349,452 A    9/1994    Maeda et al.
6,094,454 A    7/2000    Mitchell et al.
(Continued)

FOREIGN PATENT DOCUMENTS

EP          1784024          5/2007
WO     WO2014052292          4/2014
(Continued)

OTHER PUBLICATIONS

Anonymous, "Advanced video coding for generic audiovisual services", ITU-T Telecommunication Standardization Sector of ITU, ITU-T Recommendation H.264, Series H: Audiovisual and Multimedia Systems, Infrastructure of Audiovisual Services—Coding of Moving Video, May 2003, pp. 1-282.
(Continued)

*Primary Examiner* — Feng Niu
(74) *Attorney, Agent, or Firm* — Brian J. Dorini; Xiaoan Lu

(57) ABSTRACT

A method of color mapping a video signal represented in a first color volume from color mapping data to be applied on a video signal represented in a second color volume is disclosed. The method comprises:
color mapping (14) said video signal represented in a first color volume from said first color volume into said second color volume in the case where said first and second color volumes are different; and
color mapping (16) said color mapped video signal based on said color mapping data.

6 Claims, 4 Drawing Sheets

(51) Int. Cl.
*G09G 5/02* (2006.01)
*H04N 9/67* (2006.01)
*H04N 19/117* (2014.01)
*H04N 19/136* (2014.01)
*H04N 19/186* (2014.01)
*H04N 19/85* (2014.01)
*H04N 1/60* (2006.01)
*H04N 19/44* (2014.01)

(52) U.S. Cl.
CPC ......... *H04N 19/117* (2014.11); *H04N 19/136* (2014.11); *H04N 19/186* (2014.11); *H04N 19/44* (2014.11); *H04N 19/85* (2014.11); *G09G 2340/06* (2013.01)

(56) References Cited

U.S. PATENT DOCUMENTS

| | | | |
|---|---|---|---|
| 6,751,347 B2* | 6/2004 | Pettigrew | G06T 11/001 348/E9.056 |
| 7,512,262 B2* | 3/2009 | Criminisi | G06K 9/00241 382/106 |
| 7,528,989 B2* | 5/2009 | Nishide | G06T 11/001 358/1.9 |
| 8,526,727 B2* | 9/2013 | Maltz | G06K 9/00 345/604 |
| 8,620,141 B2 | 12/2013 | Date et al. | |
| 9,313,360 B2* | 4/2016 | Morovic | H04N 1/32309 |
| 9,648,341 B2* | 5/2017 | Laroche | H04N 19/52 |
| 9,794,539 B2* | 10/2017 | Kozuka | H04N 21/43635 |
| 10,097,738 B2* | 10/2018 | Laroche | H04N 19/52 |
| 2001/0028735 A1* | 10/2001 | Pettigrew | G06T 11/001 382/162 |
| 2005/0128499 A1 | 6/2005 | Glickman | |
| 2006/0007510 A1* | 1/2006 | Nishide | G06T 11/001 358/518 |
| 2006/0193509 A1* | 8/2006 | Criminisi | G06K 9/00241 382/154 |
| 2009/0040573 A1* | 2/2009 | Lee | G06T 11/001 358/505 |
| 2011/0305389 A1* | 12/2011 | Maltz | G06T 11/001 382/167 |
| 2012/0062616 A1* | 3/2012 | Nose | G02F 1/13718 345/690 |
| 2012/0127385 A1* | 5/2012 | Nose | G02F 1/1347 349/33 |
| 2012/0177124 A1* | 7/2012 | Laroche | H04N 19/52 375/240.16 |
| 2013/0148029 A1* | 6/2013 | Gish | G09G 5/02 348/708 |
| 2014/0003498 A1 | 1/2014 | Sullivan | |
| 2014/0192149 A1 | 7/2014 | Wang et al. | |
| 2016/0037017 A1* | 2/2016 | Morovic | H04N 1/32309 358/3.28 |
| 2016/0344990 A1* | 11/2016 | Kozuka | H04N 21/43635 |
| 2017/0208223 A1* | 7/2017 | Laroche | H04N 19/52 |
| 2017/0272719 A1* | 9/2017 | Kozuka | H04N 21/43635 |

FOREIGN PATENT DOCUMENTS

| | | |
|---|---|---|
| WO | WO2015007599 | 1/2015 |
| WO | WO2015144566 | 10/2015 |

OTHER PUBLICATIONS

Anonymous, "Derivation of Basic Television Color Equations", SMTPE Recommended Practice, RP 177-1993, Nov. 1, 1993, Reaffirmed 2002, pp. 1-4.

Korat et al., "Novel Video Codec Based on Wavelet-DCT Coefficients and Hybrid Motion Estimation Technique", International Journal of Darshan Institute on Engineering Research & Emerging Technologies, vol. 3, No. 1, 2014, pp. 65-69.

Anonymous, "Welcome to the JCT-VC document management system", JCT-VC website, http://phenix.int-evry.fr/jct/main.php, Feb. 23, 2912, p. 1.

Boyce et al., "Draft high efficiency video coding (F-EVC) version 2, combined format range extensions (Rext), scalability (SHVC), and multi-view (MV-HEVC) extensions", Document: JCTVC-R1013_v6, Joint Collaborative Team on Video Coding (JCT-VC) of ITU-T SG 16 WP 3 and ISO/IEC JTC 1/SC 29/WG 11, 18th Meeting, Sapporo, Japan, Jun. 30, 2014, pp. 1-535.

Fogg et al., "Indication od SMPTE 2084 and 2085 and carriage of 2086 metadata in HEVC", Document: JCTVC-P0084r1, Joint Collaborative Team on Video Coding (JCT-VC) of ITU-T SG 16 WP 3 and ISO/IEC JTC 1/SC 29/WG 11, 16th Meeting, San José, California, USA, Jan. 9, 2014, pp. 1-5.

Andrivon et al., "SEI message for Colour Mapping Information", Document: JCTVC-P0126r1, Joint Collaborative Team on Video Coding (JCT-VC) of ITU-T SG 16 WP 3 and ISO/IEC JTC 1/SC 29/WG 11, 16th Meeting, San José, California, USA, Jan. 9, 2014, pp. 1-9.

Segall et al., "Tone Mapping SEI Message", Document: JVT-T060, Joint Video Team (JVT) of ISO/IEC MPEG & ITU-T VCEG (ISO/IEC JTC 1/SC 29/WG 11 and ITU-T SG16 Q.6), 20th Meeting, Klagenfurt, Austria, Jul. 17, 2006, pp. 1-13.

* cited by examiner

METHOD FOR COLOR MAPPING A VIDEO SIGNAL BASED ON COLOR MAPPING DATA AND METHOD OF ENCODING A VIDEO SIGNAL AND COLOR MAPPING DATA AND CORRESPONDING DEVICES

This application claims the benefit, under 35 U.S.C. § 365 of International Application PCT/EP2015/072725, filed Oct. 1, 2015, which was published in accordance with PCT Article 21(2) on Apr. 21, 2016, in English, and which claims the benefit of European Patent Application 14306650.4, filed Oct 17, 2014.

1. FIELD OF THE INVENTION

In the following, a method of color mapping a video signal based on color mapping data and a corresponding device are disclosed. A method of encoding a video signal and color mapping data is disclosed. A corresponding encoding device is further disclosed.

2. BACKGROUND OF THE INVENTION

Color mapping data are data accompanying pictures or video signal and providing information to help mapping the colors of these pictures or video signal into another color space or color volume. A color volume is specified by color primaries and reference white and further by a dynamic range (i.e. min/max luminance peaks). Examples of such a color volumes are RGB BT.2020 with D65 reference white and with min luminance peak equal to 0 nit (or $cd/m^2$) and max luminance peak equal to 4000 nits. RGB BT.2020 with D65 reference white and with min luminance peak equal to 0 nit (or $cd/m^2$) and max luminance peak equal to 100 nits is another example of such a color volume. The document JCTVC R1013_v6 defines (sections D.2.27 and D.3.27) an SEI message "Mastering Display Color Volume SEI" specifying such a color volume.

The color mapping data defined in section D.3.32 of the document JCTVC R1013_v6 are example of such color mapping data. In this document, the color mapping data are indicated in a SEI message (SEI is the English acronym of "Supplemental Enhancement Information"). A color mapping function may be defined from several fields of the SEI message. The color mapping data may be created to enable to color map a version of video signal created for Blu-Ray into a version of the same video signal for DVD.

The color mapping data are usually determined in a studio or authoring facilities, i.e. on the production side, from RGB 4:4:4 or YUV 4:2:0 video signals. The color mapping data are not necessarily created at the same time as encoding the video signal. In fact, encoding the video signal and creating the color mapping data may be achieved by different operators. Consequently, when transmitting the color mapping data and the encoded video signal to a receiver, the receiver (specifically a decoder) is going to decode the color mapping data and the video signal without any knowledge of the conditions (e.g. information of the color space) of creation of the color data with respect to the conditions of encoding of the video signal. In these conditions, applying the color mapping data on the decoded video signal may degrade the color mapped decoded video signal.

3. BRIEF SUMMARY OF THE INVENTION

A method of color mapping a video signal represented in a first color volume from color mapping data to be applied on a video signal represented in a second color volume is disclose. The method comprises:
  color mapping the video signal represented in a first color volume from the first color volume into the second color volume in the case where the first and second color volumes are different; and
  color mapping the color mapped video signal based on the color mapping data.

The color mapping based on color mapping data is improved because being applied on video data represented in a color volume for which the color mapping data were designed.

According to a first embodiment, color mapping the video signal from the first color volume into the second color volume in the case where the first and second color volumes are different comprises comparing the first and second color volumes to determine if the first and second color volumes are different.

According to a second embodiment, color mapping the video signal from the first color volume into the second color volume in the case where the first and second color volumes are different comprises obtaining an indicator indicating whether a color mapping based on the color mapping data is to be applied directly on the video signal or whether the color mapping based on the color mapping data is to be applied on the video signal after its color mapping into the second color space and color mapping the video signal into the second color space responsive to the indicator.

Advantageously, the indicator further indicates the second color volume.

According to a specific embodiment, obtaining the indicator comprises decoding the indicator.

Advantageously, color mapping the video signal represented in a first color volume from the first color volume into the second color volume in the case where the first and second color volumes are different comprises determining the first color volume from decoded data.

According to a specific embodiment, color mapping the video signal represented in a first color volume from the first color volume into the second color volume in the case where the first and second color volumes are different comprises determining the first color volume at least from video usability information.

According to a specific embodiment, color mapping the video signal represented in a first color volume from the first color volume into the second color volume in the case where the first and second color volumes are different comprises determining the first color volume further from Mastering Display Color Volume SEI message.

According to a specific characteristic, the first color volume and the second color volume are color spaces.

A device of color mapping a video signal represented in a first color volume from color mapping data to be applied on a video signal represented in a second color volume is also disclosed. The device comprises at least a processor configured to:
  color map the video signal represented in a first color volume from the first color volume into the second color volume in the case where the first and second color volumes are different; and
  color map the color mapped video signal based on the color mapping data.

A device of color mapping a video signal represented in a first color volume from color mapping data to be applied on a video signal represented in a second color volume is also disclosed. The device comprises:

means for color mapping the video signal represented in a first color volume from the first color volume into the second color volume in the case where the first and second color volumes are different; and means for color mapping the color mapped video signal based on the color mapping data.

According to a first embodiment, color mapping the video signal from the first color volume into the second color volume in the case where the first and second color volumes are different comprises comparing the first and second color volumes to determine if the first and second color volumes are different.

According to a second embodiment, color mapping the video signal from the first color volume into the second color volume in the case where the first and second color volumes are different comprises obtaining an indicator indicating whether a color mapping based on the color mapping data is to be applied directly on the video signal or whether the color mapping based on the color mapping data is to be applied on the video signal after its color mapping into the second color volume and color mapping the video signal into the second color volume responsive to the indicator.

Advantageously, the indicator further indicates the second color volume.

According to a specific embodiment, obtaining the indicator comprises decoding the indicator.

According to a specific embodiment, color mapping the video signal represented in a first color volume from the first color into the second color volume in the case where the first and second color volume are different comprises determining the first color volume from decoded data.

According to a specific embodiment, color mapping the video signal represented in a first color volume from the first color volume into the second color volume in the case where the first and second color volumes are different comprises determining the first color volume at least from video usability information.

According to a specific embodiment, color mapping the video signal represented in a first color volume from the first color volume into the second color volume in the case where the first and second color volumes are different comprises determining the first color volume further from Mastering Display Color Volume SEI message.

According to a specific characteristic, the first color volume and the second color volume are color spaces.

A coding method is also disclosed that comprises:
coding a video signal represented in a first color volume;
coding color mapping data to be applied on a video signal represented in a second color volume;
coding an indicator indicating whether a color mapping based on the color mapping data is to be applied directly on a video signal or whether the color mapping based on the color mapping data is to be applied on a video signal after its color mapping from the first color volume into the second color volume.

A coding device is also disclosed that comprises at least a processor configured to:
code a video signal represented in a first color volume;
code color mapping data to be applied on a video signal represented in a second color volume;
code an indicator indicating whether a color mapping based on the color mapping data is to be applied directly on a video signal or whether the color mapping based on the color mapping data is to be applied on a video signal after its color mapping from the first color volume into the second color volume.

A coding device is also disclosed that comprises:
means for coding a video signal represented in a first color volume;
means for coding color mapping data to be applied on a video signal represented in a second color volume;
means for coding an indicator indicating whether a color mapping based on the color mapping data is to be applied directly on a video signal or whether the color mapping based on the color mapping data is to be applied on a video signal after its color mapping from the first color volume into the second color volume.

Advantageously, the indicator further indicates the second color volume.

Advantageously, the video signal, the color mapping data and/or a bitstream from which the video signal is decoded is/are obtained from a source belonging to a set comprising:
a local memory;
a storage interface,
a communication interface; and
an image capturing circuit.

Advantageously, the video signal color mapped based on the color mapping data is sent to a destination belonging to a set comprising:
a local memory;
a storage interface,
a communication interface; and
a display device.

Advantageously, the device belongs to a set comprising:
a mobile device;
a communication device;
a game device;
a set top box;
a TV set;
a Blu-ray Disc player;
a tablet (or tablet computer);
a laptop;
a display and
a decoding chip.

Advantageously, the video signal and/or the color mapping data are obtained from a source belonging to a set comprising:
a local memory;
a storage interface,
a communication interface; and
an image capturing circuit.

Advantageously, the video signal and the color mapping data being encoded into at least one bitstream, the at least one bitstream is sent to a destination belonging to a set comprising:
a local memory;
a storage interface, and
a communication interface.

Advantageously, the device belongs to a set comprising:
a mobile device;
a communication device;
a game device;
a tablet;
a laptop;
a still image camera;
a video camera;
an encoding chip;
a still image server; and
a video server.

A storage media having a signal encoded thereupon is disclosed. The signal comprises color mapping data to be applied in a given color volume; and an indicator indicating whether a color mapping based on said color mapping data is to be applied directly on a video signal or whether said color mapping based on said color mapping data is to be applied on the video signal after its color mapping into said given color volume. The signal further comprises the video signal. The indicator further indicates said given color volume.

A method for transmitting this signal is disclosed such as a method for receiving the signal.

4. BRIEF DESCRIPTION OF THE DRAWINGS

In the drawings, an embodiment of the present invention is illustrated. It shows:

5. DETAILED DESCRIPTION OF THE INVENTION

In the following, color mapping may comprise tone-mapping or inverse tone-mapping operations. All the embodiments and variants disclosed with color spaces may be applied with color volumes. In this case, the min/max luminance peaks are also considered in addition to color primaries and reference white.

Figure 1:
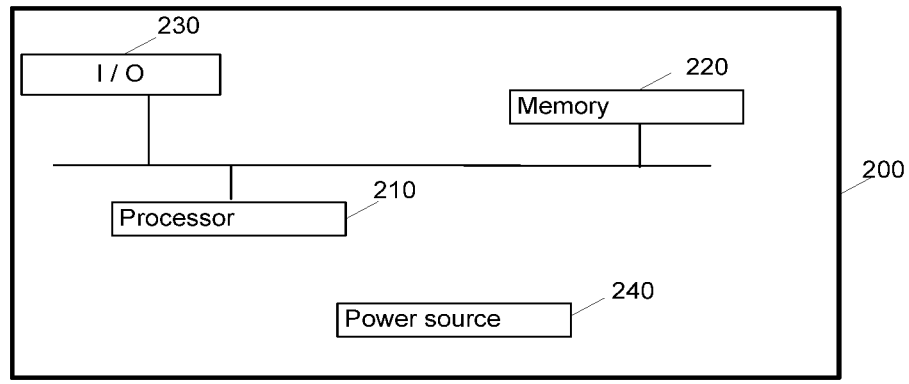
FIG. 1 represents an exemplary architecture of a device configured to color map a video signal represented in a first color space according to an exemplary embodiment.

FIG. 1 represents, according to a specific and non-limitative embodiment, an exemplary architecture of a device 200 configured to color map a video signal represented in a first color space according to an exemplary embodiment. The color mapping of the video signal is based on color mapping data to be applied on a video signal represented in a second color space. It will be understood that, although the terms first and second may be used herein to describe various color spaces/volumes, these color spaces/volumes should not be limited by these terms. These terms are only used to distinguish one color space/volume from another. For example, a first color space/volume could be termed "a second color space/volume" or "a color space/volume", and, similarly, a second color space/volume could be termed "another color space/volume" or "a first color space/volume" without departing from the present principles. The device 200 may be part of a receiver or decoder. The device 200 comprises one or more processor(s) 210, which is(are), for example, a CPU, a GPU and/or a DSP (English acronym of Digital Signal Processor), along with internal memory 220 (e.g. RAM, ROM, EPROM). The device 200 comprises one or several Input/Output interface(s) 230 adapted to display output information and/or allow a user to enter commands and/or data (e.g. a keyboard, a mouse, a touchpad, a webcam); and a power source 240 which may be external to the device 200.

The device 200 may also comprise network interface(s) (not shown). The video signal and/or the color mapping data may be obtained from a source. In a variant, the video signal is decoded from a bitstream which is itself obtained from a source. A bitstream is a sequence of bits. In another variant, the color mapping data is decoded from a bitstream obtained from a source. In yet another variant, both the video signal and the color mapping data are decoded from one or two bitstream(s) obtained from a source. According to different embodiments, the source belongs to a set comprising:
   a local memory, e.g. a video memory, a RAM, a flash memory, a hard disk;
   a storage interface, e.g. an interface with a mass storage, a ROM, an optical disc or a magnetic support;
   a communication interface, e.g. a wireline interface (for example a bus interface, a wide area network interface, a local area network interface) or a wireless interface (such as a IEEE 802.11 interface or a Bluetooth interface); and
   an image capturing circuit (e.g. a sensor such as, for example, a CCD (or Charge-Coupled Device) or CMOS (or Complementary Metal-Oxide-Semiconductor)).

According to different embodiments, the video signal color mapped based on the color mapping data may be sent to a destination. As an example, the color mapped video signal is stored in a remote or in a local memory, e.g. a video memory or a RAM, a hard disk. In a variant, the color mapped video signal is sent to a storage interface, e.g. an interface with a mass storage, a ROM, a flash memory, an optical disc or a magnetic support and/or transmitted over a communication interface, e.g. an interface to a point to point link, a communication bus, a point to multipoint link or a broadcast network.

According to an exemplary and non-limitative embodiment, the device 200 further comprises a computer program stored in the memory 220. The computer program comprises instructions which, when executed by the device 200, in particular by the processor 210, make the device 200 carry out the method described with reference to FIG. 2. According to a variant, the computer program is stored externally to the device 200 on a non-transitory digital data support, e.g. on an external storage medium such as a HDD, CD-ROM, DVD, a read-only and/or DVD drive and/or a DVD Read/Write drive, all known in the art. The device 200 thus comprises an interface to read the computer program. Further, the device 200 could access one or more Universal Serial Bus (USB)-type storage devices (e.g., "memory sticks.") through corresponding USB ports (not shown).

According to exemplary and non-limitative embodiments, the device 200 is a device, which belongs to a set comprising:
   a mobile device;
   a communication device;
   a game device;
   a set top box;
   a TV set;
   a Blu-ray Disc player;
   a tablet (or tablet computer);
   a laptop;
   a display and
   a decoding chip.

Figure 2:
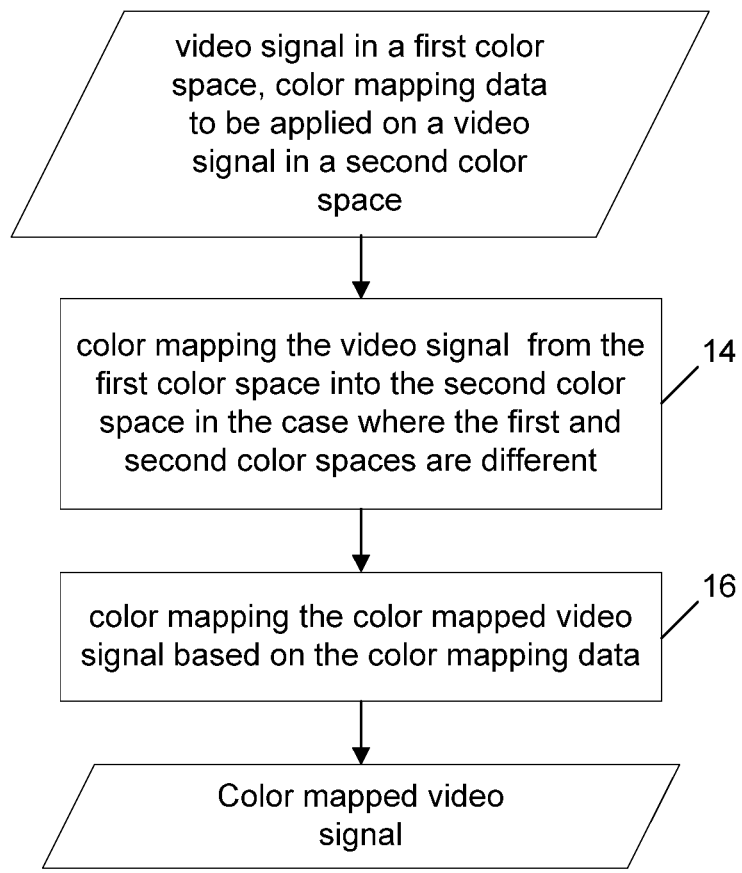
FIG. 2 represents a flowchart of a method for color mapping a video signal represented in a first color space according to a specific and non-limitative embodiment.

FIG. 2 represents a flowchart of a method for color mapping a video signal represented in a first color space according to a specific and non-limitative embodiment. The color mapping of the video signal is based on color mapping data to be applied on a video signal represented in a second color space. The video signal is for example obtained from a decoder in which case it is a decoded video signal. The color mapping data are for example decoded from a bitstream in which case they are decoded color mapping data.

In a step 14, the video signal is color mapped from the first color space into the second color space in the case where the first and second color spaces are different. Thus, the colors of the video signal are transformed. Exemplarily, the first color space is an YUV color space or an YUV color space with specific color primaries. In a variant, the first color space is a RGB color space. Exemplarily, the second color space is a RGB color space or a RGB color space with specific color primaries and reference white.

In a first and non-limiting embodiment, color mapping the video signal into the second color space comprises comparing the first and the second color spaces to determine if the first and second color spaces are different. To this aim, the first color space is determined or obtained from decoded data. The decoded data are for example decoded video usability information (whose acronym is VUI) as defined in sections E.2 and E.3 of JCTVC-R1013_v6. These decoded data may be associated with the video signal represented in the first color space. VUI is "side information" that may be used by a decoder to enhance or improve the decoded picture on a display. Specifically, the matrix_coeffs indicator as defined in the table E.5 makes it possible to determine whether the first color space is an RGB color space or an YUV color space. Exemplarily, if matrix_coeffs=0, then the first color space is an RGB color space and if matrix_coeffs=1, 4, 5, 6, 7, 9 and 10, the first color space is an YUV color space. In addition, the indicator colour_primaries indicates the chromaticity coordinates of the source primaries. Specifically, it defines the color primaries and the reference white and makes it possible to completely characterize the first color space. The second color space may be specified by the application or by a standard (e.g. such as Blu-ray Disc Association whose acronym is BDA). In this case, the second color space is fixed and known by the color mapping function. In a variant, the second color space may be specified by an indicator. As an example, the indicator may take the value 0 to indicate that the second color space is RGB BT. 2020 color space, a value 1 to indicate that the second color space is RGB BT. 709 color space, a value 2 to indicate the second color space is RGB BT. 601 color space etc. In yet another example, the indicator may take the value 0 to indicate that the second color space is RGB and a value 1 to indicate that the second color space is YCC (luma plus color difference), etc. In this case, the first color space and the second color space obtained from the indicator are compared and the color mapping data are either applied directly on the video signal in the case where the first and second color space are identical or are applied on the video signal after it is mapped into the second color space in the case where the first and second color space are different.

Comparing the first and second color spaces may comprise comparing color primaries and reference white. However, comparing the color primaries and reference white is not mandatory. Indeed, an application/standard may require that the color mapping data and the video signal are using the same primaries and/or reference white even if represented in different color spaces (e.g. YUV BT.2020 and RGB BT.2020). The video signal is finally color mapped from the first color space into the second color space based on this comparison. Indeed, when the comparison indicates that the first and the second color spaces are different then the video signal is color mapped from the first color space into the second color space. Color mapping usually comprises applying a color mapping function defined from said first and second color spaces. The color mapping function can be proprietary or defined by a standard like SMPTE RP 177. When the comparison indicates that the first and the second color space are identical, then the video signal is not color mapped. In the case where the first and second color spaces are in fact color volumes then the min and max luminance peaks of the first color volume may be obtained or determined from decoded data such as from the Mastering Display Color Volume SEI. The first color volume is thus completely defined by the VUI and the Mastering Display Color Volume SEI. The second color space may be specified by the application or by a standard (e.g. such as Blu-ray Disc Association whose acronym is BDA). Comparing the first and second color volumes may comprise comparing color primaries, reference white and min/max luminance peaks.

In a second and non-limiting embodiment, color mapping the video signal into the second color space comprises obtaining an indicator indicating whether a color mapping based on the color mapping data is to be applied directly on the video signal or whether the color mapping based on the color mapping data is to be applied on the video signal after its color mapping into the second color space and color mapping the video signal into the second color space responsive to the indicator. The indicator may be obtained from a decoder or from a memory, etc. In a variant, obtaining the indicator may comprise decoding the indicator from a bitstream. "colour_remap_id" defined in section D.3.32 of JCTVC-R1013_v6 is an example of such indicator. In JCTVC-R1013_v6, the "colour_remap_id" is defined as containing an identifying number that may be used to identify the purpose of the colour remapping information. The value of colour_remap_id shall be in the range of 0 to $2^{32}$-2, inclusive. In a variant, the indicator is decoded from a transport stream. A transport stream is a format for transmission and storage of audio, video or other data. The indicator may be a binary flag taking a first value (e.g. the value 0) to indicate that the color mapping based on the color mapping data is to be applied directly on the video signal and taking a second value different from the first value (e.g. the value 1) to indicate that the color mapping based on the color mapping data is to be applied on the video signal after its color mapping into the second color space. The second color mapping based on the color mapping data can also be called color remapping because a first color mapping is already applied at step 14 in the case where the first and second color spaces are different. This solution is sufficient in the case where the color primaries/reference white (and possibly min/max luminance peaks in case of color volume) of the second color space are fixed, e.g. because being defined by an application or a standard (e.g. DVB, ATSC or BDA). In a variant, the indicator may take more than 2 values in order to precisely define the color primaries of the second color space because, for example, they are not defined by the application, or by a standard (e.g. DVB, ATSC or BDA). Exemplarily, the indicator may take the value 0 to indicate that the color mapping based on the color mapping data is to be applied directly on the video signal, the value 1 to indicate that the color mapping based on the color mapping data is to be applied on video signal after its color mapping into an RGB BT. 2020 color space, the value 2 to indicate that the color mapping based on the color mapping data is to be applied on video signal after its color mapping into an RGB BT. 709 color space, etc. In a variant, the second color space may be specified by an indicator. As an example, the indicator may take the value 0 to indicate that the second color space is RGB BT. 2020 color space, a value 1 to indicate that the second color space is RGB BT. 709 color space, a value 2 to indicate the second color space is RGB BT. 601 color space, etc. In yet another example, the indicator may take the value 0 to indicate that the second color space is RGB and a value 1 to indicate that the second color space is YCC (luma plus color difference), etc. In this case, the first color space and the second color space obtained from the indicator are compared and the color mapping data are either applied directly on the video signal in the case where the first and second color space are identical or are applied on the video signal after it is mapped into the second color space in the case where the first and second color space are different. In this embodiment, the first color space may either be specified by an application or a standard or be determined from decoded data as in the first embodiment (e.g. from decoded VUI). Color mapping usually comprises applying a color mapping function defined from said first and second color spaces. The color mapping function can be proprietary or defined by a standard like SMPTE RP 177.

In a step 16, the color mapped video signal is color mapped based on the color mapping data. In the case where the first and the second color spaces are identical, the video signal is directly color mapped based on the color mapping data. In the case where the first and second color spaces are different, the video signal is color mapped successively twice: a first time to map its colors from the first to the second color space and a second time to map its colors from the second color space based on the color mapping data.

Figure 3A:
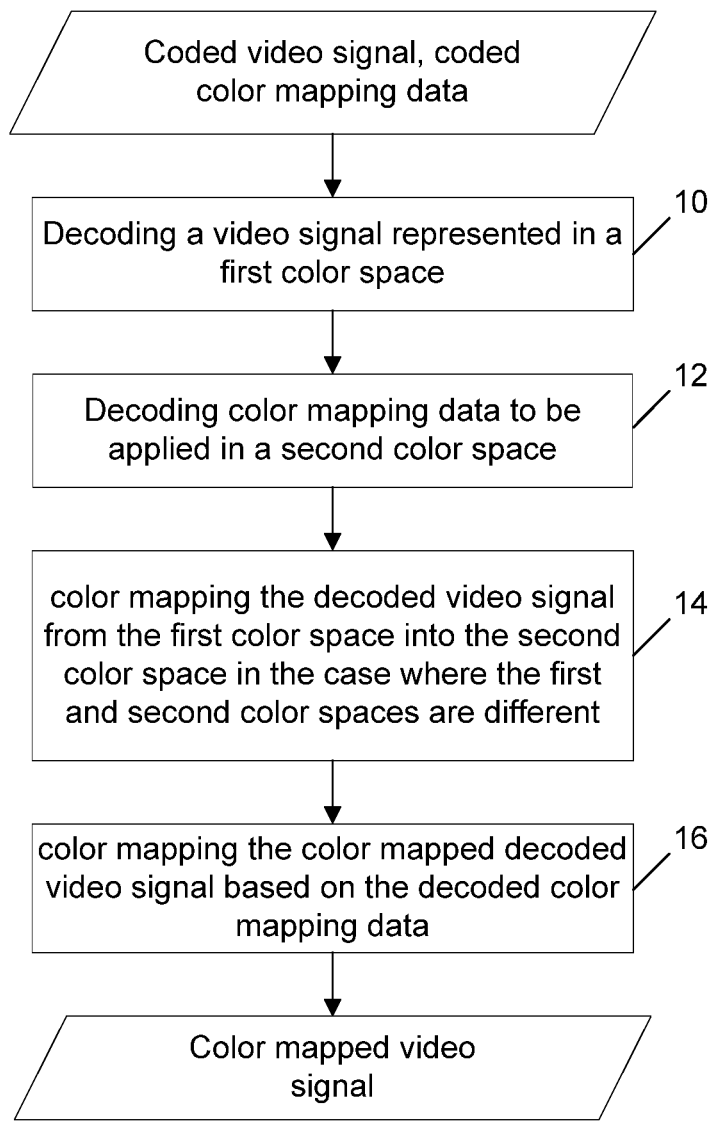
FIG. 3A and 3B represent a flowchart of a method for decoding a video signal represented in a first color space according to specific and non-limitative embodiments.

In a specific and non-limiting embodiment illustrated by FIG. 3A, the color mapping method is part of a decoding method. In this case, the decoding method comprises, in a step 10, decoding the video signal and, in a step 12, decoding the color mapping data. The steps 14 and 16 of the color mapping method are applied on a decoded video signal with decoded color mapping data.

In an optional step 10, a video signal represented in a first color space is decoded from a bitstream F. The decoded video may be accompanied by decoded data, e.g. VUI, Mastering Display Color Volume SEI. In a specific and non-limiting embodiment, decoding the video signal comprises, for a block of an image of the video, determining a prediction of the block. A block is also known in the literature as a coding unit. Determining the prediction, particularly in the case of inter prediction, comprises decoding motion vectors and applying the decoded motion vectors to reference blocks, that is to say blocks that have already been reconstructed/decoded. A residual is decoded and added to the prediction to reconstruct the block. The residual is classically decoded by entropy decoding and by applying an inverse quantization and an inverse transform (e.g. an inverse DCT). Exemplarily, the video signal may be decoded using H.264 or H.265 compliant decoding methods. It will be appreciated, however, that the invention is not restricted to this specific decoding method.

In the step 12, color mapping data to be applied on a video signal in the second color space are decoded. The color mapping data are for example decoded from the same bitstream F or from another bitstream different from F. The indicator of step 14 may also be decoded from the same bitstream F. Color mapping data comprises data making it possible to transform the color of an image or of a video signal from a color space (e.g. YUV) into a different color space (RGB, YCC), or from a color space (RGB BT. 709) into the same color space but with different color primaries (RGB BT. 2020). Exemplarily, the color mapping data are decoded as specified in section D.3.32 of the standard document JCTVC-R1013_v6. In the SHVC standard, the color mapping data are decoded from a SEI message (SEI is the English acronym of "Supplemental Enhancement Information"). The SEI message is named "color remapping information SEI". It provides data to enable (re)mapping of the reconstructed colour samples of the output pictures. The colour (re)mapping data may be applied directly to the decoded sample values, regardless of whether they are in the luma and chroma domain or the RGB domain. The colour (re)mapping model used in the colour remapping information SEI message is composed of a first piece-wise linear function applied to each colour component (specified by the "pre" set of syntax elements herein), a three by-three matrix applied to the three colour components, and a second piece-wise linear function applied to each colour component (specified by the "post" set of syntax elements herein). It will be appreciated, however, that the invention is not restricted to the specific color mapping data as defined in JCTVC-R1013_v6.

Figure 3B:
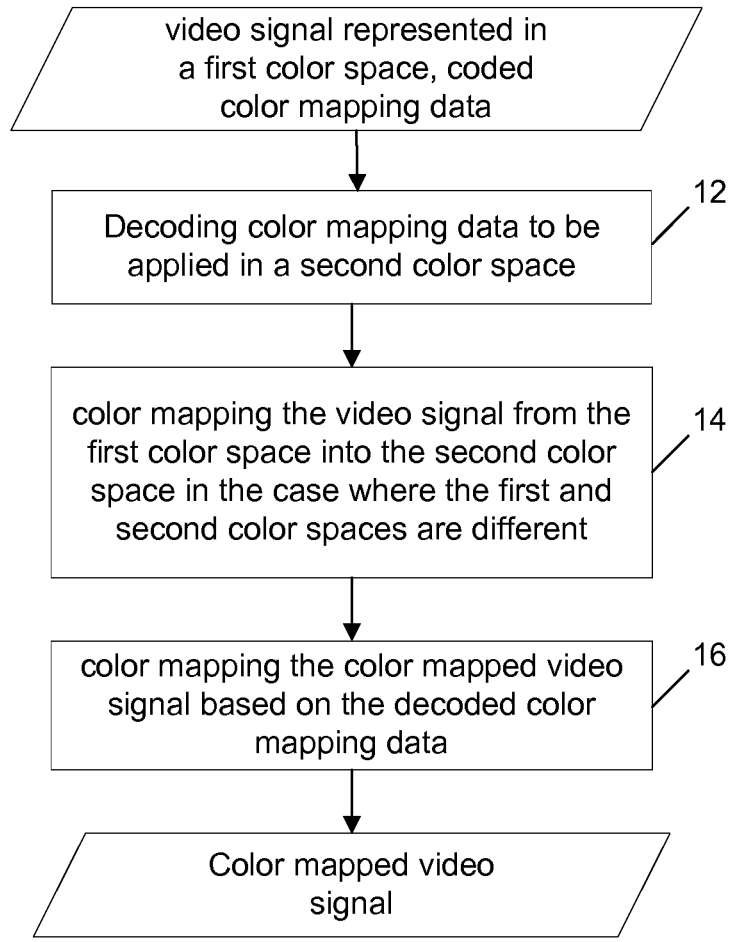

In another specific and non-limiting embodiment illustrated by FIG. 3B, the color mapping method is part of a decoding method. In this case, the decoding method comprises decoding the color mapping data in the step 12. The steps 14 and 16 of the color mapping method are applied on a video signal with decoded color mapping data. The video signal is for example obtained from a source (e.g. a memory, a communication interface, etc).

In a variant, a receiving method is disclosed that comprises:
  receiving color mapping data to be applied in a given color volume; and
  receiving an indicator indicating whether a color mapping based on said color mapping data is to be applied directly on a video signal or whether said color mapping based on said color mapping data is to be applied on said video signal after its color mapping into said given color volume.

The receiving method may further comprise receiving the video signal.

A receiver is also disclosed that comprises at least a processor configured to:
  receive color mapping data to be applied in a given color volume; and
  receive an indicator indicating whether a color mapping based on said color mapping data is to be applied directly on a video signal or whether said color mapping based on said color mapping data is to be applied on said video signal after its color mapping into said given color volume.

The processor may be further configured to receive the video signal.

The indicator may further indicate said given color volume.

Figure 4:
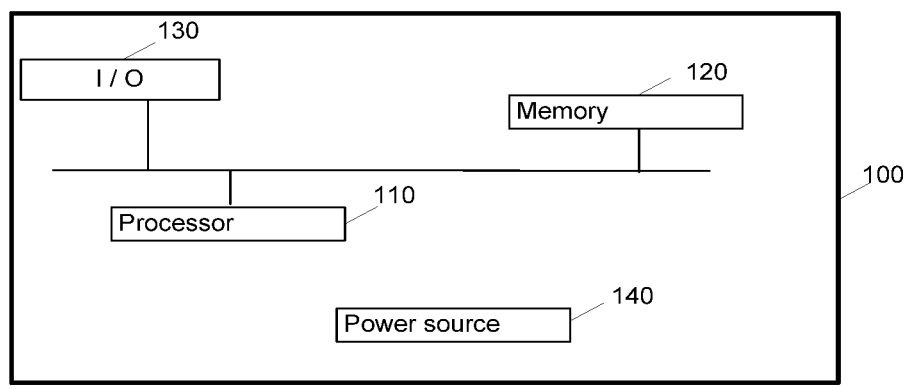
FIG. 4 represents an exemplary architecture of an encoding device configured to encode a video signal represented in a first color space according to a specific and non-limitative embodiment.

FIG. 4 represents, according to a specific and non-limitative embodiment, an exemplary architecture of an encoding device 100 configured to encode color mapping data and possibly a video signal into a bitstream, wherein the video signal is represented in a first color space . The color mapping data may be encoded in the same bitstream as the video signal or in another one. The encoding device 100 comprises one or more processor(s) 110, which is(are), for example, a CPU, a GPU and/or a DSP (English acronym of Digital Signal Processor), along with internal memory 120 (e.g. RAM, ROM, EPROM). The encoding device 100 comprises one or several Input/Output interface(s) 130 adapted to display output information and/or allow a user to enter commands and/or data (e.g. a keyboard, a mouse, a touchpad, a webcam); and a power source 140 which may be external to the encoding device 100. The device 100 may also comprise network interface(s) (not shown). The video signal and/or the color mapping data may be obtained from a source, not necessarily the same. According to different embodiments, the source belongs to a set comprising:
- a local memory, e.g. a video memory, a RAM, a flash memory, a hard disk;
- a storage interface, e.g. an interface with a mass storage, a ROM, an optical disc or a magnetic support;
- a communication interface, e.g. a wireline interface (for example a bus interface, a wide area network interface, a local area network interface) or a wireless interface (such as a IEEE 802.11 interface or a Bluetooth interface); and
- an image capturing circuit (e.g. a sensor such as, for example, a CCD (or Charge-Coupled Device) or CMOS (or Complementary Metal-Oxide-Semiconductor)).

According to different embodiments, the bitstream(s) may be sent to a destination. As an example, the bitstream(s) is (are) stored in a remote or in a local memory, e.g. a video memory or a RAM, a hard disk. In a variant, the bitstream is sent to a storage interface, e.g. an interface with a mass storage, a ROM, a flash memory, an optical disc or a magnetic support and/or transmitted to a receiving device over a communication interface, e.g. an interface to a point to point link, a communication bus, a point to multipoint link or a broadcast network. Therefore, the signal (e.g. the bitstream) comprising the color mapping data may be either stored in a memory or in a file and/or transmitted to a receiving device (e.g. a decoder, a display, etc).

According to an exemplary and non-limitative embodiment, the encoding device 100 further comprises a computer program stored in the memory 120. The computer program comprises instructions which, when executed by the encoding device 100, in particular by the processor 110, make the encoding device 100 carry out the method described with reference to FIG. 5.

According to a variant, the computer program is stored externally to the encoding device 100 on a non-transitory digital data support, e.g. on an external storage medium such as a HDD, CD-ROM, DVD, a read-only and/or DVD drive and/or a DVD Read/Write drive, all known in the art. The encoding device 100 thus comprises an interface to read the computer program. Further, the encoding device 100 could access one or more Universal Serial Bus (USB)-type storage devices (e.g., "memory sticks.") through corresponding USB ports (not shown).

According to exemplary and non-limitative embodiments, the encoding device 100 is a device, which belongs to a set comprising:
- a mobile device;
- a communication device;
- a game device;
- a tablet (or tablet computer);
- a laptop;
- a still image camera;
- a video camera;
- an encoding chip;
- a still image server; and
- a video server (e.g. a broadcast server, a video-on-demand server or a web server).

Figure 5:
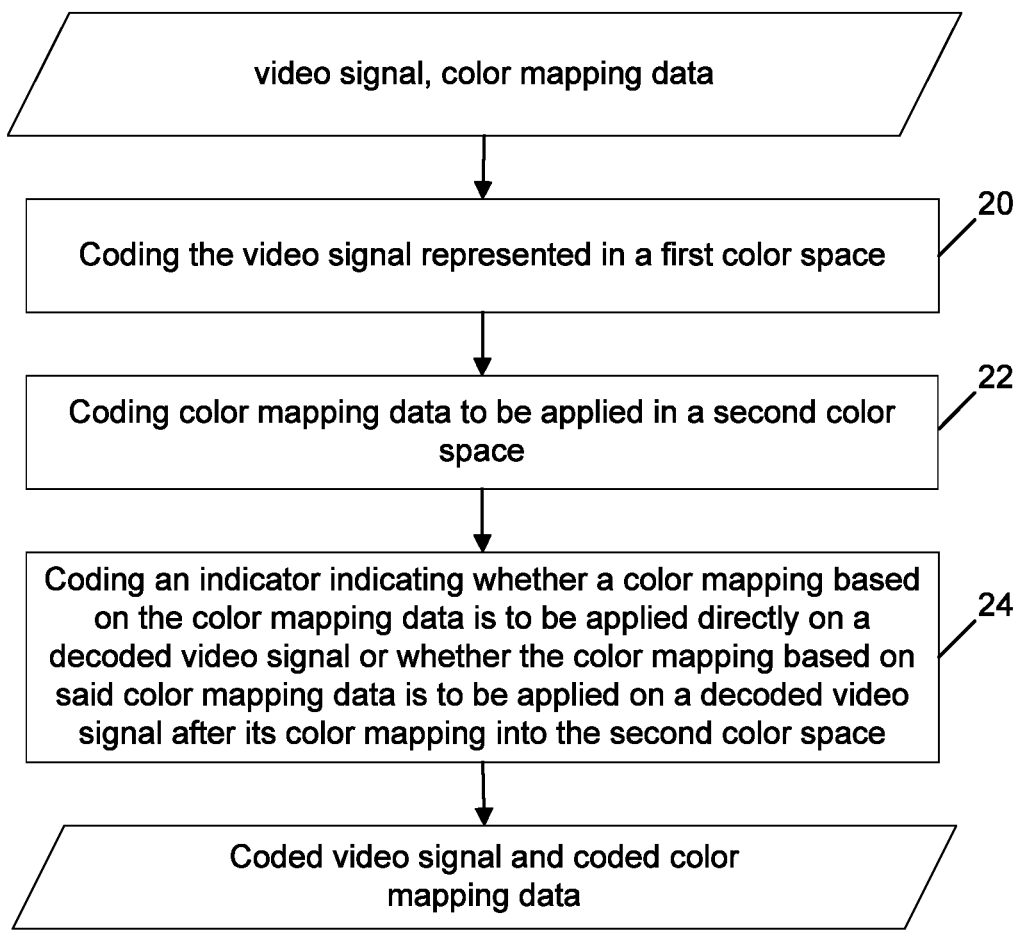
FIG. 5 represents a flowchart of a method for encoding a video signal represented in a first color space according to a specific and non-limitative embodiment.

FIG. 5 represents, according to a specific and non-limitative embodiment, a flowchart of a method for encoding color mapping data and possibly a video signal in a bitstream represented in a first color space according to a specific and non-limitative embodiment.

In an optional step 20, the video signal is coded. Exemplarily, the first color space is an YUV color space or an YUV color space with specific color primaries. In a variant, the first color space is a RGB color space. In a specific and non-limiting embodiment, coding the video signal comprises, for a block of an image of the video, determining a prediction of the block. Determining the prediction, particularly in the case of inter prediction, comprises determining motion vectors with respect to reconstructed blocks taken as references. The prediction is then determined from the motion vectors and the reference reconstructed blocks. The prediction is subtracted from the block to be coded in order to obtain a residual and the residual is encoded. Classically, encoding the residual comprises applying a transformation T (e.g. a DCT) to the residual in order to produce coefficients, which are in turn quantized and entropy coded. The block may then be reconstructed in order to produce a reconstructed block. To this aim, the quantized coefficients are dequantized and an inverse transform $T^{-1}$ is applied to the dequantized coefficients. The prediction is then added to the result of the inverse transform $T^{-1}$ in order to produce a reconstructed block. The reconstructed block may serve as reference when coding other blocks. Exemplarily, the video signal may be encoded using H.264 or H.265 compliant encoding methods. It will be appreciated, however, that the invention is not restricted to this specific encoding method.

In a step 22, color mapping data to be applied on a video signal represented in a second color space are coded, for example in the bitstream F or in another bitstream different from F. Exemplarily, the color mapping data are encoded as specified in section D.3.32 of the standard document JCTVC-R1013_v6. In the SHVC standard, the color mapping data are encoded in a SEI message (SEI is the English acronym of "Supplemental Enhancement Information"). The SEI message is named "color remapping information SEI". It provides data to enable color mapping of the reconstructed colour samples of the output pictures. The colour mapping data may be applied directly to the decoded sample values, regardless of whether they are in the luma and chroma domain or the RGB domain. The colour mapping model used in the colour (re)mapping information SEI message is composed of a first piece-wise linear function applied to each colour component (specified by the "pre" set of syntax elements herein), a three by-three matrix applied to the three colour components, and a second piece-wise linear function applied to each colour component (specified by the "post" set of syntax elements herein).

In a step 24, an indicator indicating whether a color mapping based on the color mapping data is to be applied directly on a video signal, possibly decoded, or whether the color mapping based on said color mapping data is to be applied on a video signal, possibly decoded, after its color mapping into said second color space is encoded, for example in the bitstream F. The indicator is for example encoded using the "colour_remap_id" defined in section D.3.32 of JCTVC-R1013_v6. In JCTVC-R1013_v6, the "colour_remap_id" is defined as containing an identifying number that may be used to identify the purpose of the colour remapping information. The value of colour_remap_id shall be in the range of 0 to $2^{32}$-2, inclusive. In a variant, the indicator is encoded in a transport stream. A transport stream is a format for transmission and storage of audio, video or other data. The indicator may be a binary flag taking a first value (e.g. the value 0) to indicate that the color mapping based on the color mapping data is to be applied directly on the video signal and taking a second value different from the first value (e.g. the value 1) to indicate that the color mapping based on the color mapping data is to be applied on the video signal after its color mapping into the second color space. This solution is sufficient in the case where the color primaries of the second color space are fixed, e.g. because being defined by an application or a standard (e.g. DVB, ATSC or BDA). In a variant, the indicator may take more than 2 values in order to precisely define the color primaries of the second color space because, for example, they are not defined by the application, or by a standard (e.g. DVB, ATSC or BDA). Exemplarily, the indicator may take the value 0 to indicate that the color mapping based on the color mapping data is to be applied directly on the video signal, the value 1 to indicate that the color mapping based on the color mapping data is to be applied on video signal after its color mapping into an RGB BT. 2020 color space, the value 2 to indicate that the color mapping based on the color mapping data is to be applied on video signal after its color mapping into an RGB BT. 709 color space, etc. In this embodiment, the first color space may be for example specified by an application or a standard or determined from decoded data as in the first embodiment (e.g. from decoded VUI). In another variant, the indicator may simply indicate the second color space. As an example, the indicator may take the value 0 to indicate that the second color space is RGB BT. 2020 color space, a value 1 to indicate that the second color space is RGB BT. 709 color space, a value 2 to indicate the second color space is RGB BT. 601 color space, etc. In this case, the first color space and the second color space obtained from the indicator are compared and the color mapping data are either applied directly on the video signal in the case where the first and second color space are identical or are applied on the video signal after it is mapped into the second color space in the case where the first and second color space are different.

In a variant, a transmission method is disclosed that comprises:

transmitting color mapping data to be applied in a given color volume; and transmitting an indicator indicating whether a color mapping based on said color mapping data is to be applied directly on a video signal or whether said color mapping based on said color mapping data is to be applied on the video signal after its color mapping into said given color volume.

The transmission method may further comprise transmitting the video signal that may or may not be encoded.

A transmitter is also disclosed that comprises at least a processor configured to:

transmit color mapping data to be applied in a given color volume; and transmit an indicator indicating whether a color mapping based on said color mapping data is to be applied directly on a video signal or whether said color mapping based on said color mapping data is to be applied on the video signal after its color mapping into said given color volume.

The processor may be further configured to transmit the video signal that may or may not be encoded.

The indicator may further indicate said given color volume.

The implementations described herein may be implemented in, for example, a method or a process, an apparatus, a software program, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Implementations of the various processes and features described herein may be embodied in a variety of different equipment or applications, particularly, for example, equipment or applications. Examples of such equipment include an encoder, a decoder, a post-processor processing output from a decoder, a pre-processor providing input to an encoder, a video coder, a video decoder, a video codec, a web server, a set-top box, a laptop, a personal computer, a cell phone, a PDA, and other communication devices. As should be clear, the equipment may be mobile and even installed in a mobile vehicle.

Additionally, the methods may be implemented by instructions being performed by a processor, and such instructions (and/or data values produced by an implementation) may be stored on a processor-readable medium such as, for example, an integrated circuit, a software carrier or other storage device such as, for example, a hard disk, a compact diskette ("CD"), an optical disc (such as, for example, a DVD, often referred to as a digital versatile disc or a digital video disc), a random access memory ("RAM"), or a read-only memory ("ROM"). The instructions may form an application program tangibly embodied on a processor-readable medium. Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. As an example, a signal is disclosed that comprises color mapping data carrying an indicator indicating whether a color mapping based on these color mapping data is to be applied directly on a video signal or whether said color mapping based on said color mapping data is to be applied on the video signal after its color mapping into said second color volume. The same signal may also comprise the video signal. The color mapping data may thus be stored or transmitted by a transmitter to a receiving device. The information may include, for example, instructions for performing a method, or data produced by one of the described implementations. For example, a signal may be formatted to carry as data the rules for writing or reading the syntax of a described embodiment, or to carry as data the actual syntax-values written by a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method of color mapping comprising:
    decoding an indicator from a bitstream, wherein said indicator indicates whether (1) a color mapping based on color mapping data is to be applied directly on a video signal represented in a first color volume or (2) said color mapping based on said color mapping data is to be applied on said video signal after a prior color mapping of said video signal from said first color volume into a second color volume different from said first color volume, and wherein said indicator further indicates said second color volume;
    color mapping said video signal by applying the color mapping data directly on the video signal in the case where said indicator indicates said color mapping based on said color mapping data is to be applied directly on the video signal represented in the first color volume; and otherwise
    color mapping said video signal by color mapping said video signal from said first color volume into said second color volume and by applying the color mapping data on the video signal represented in said second color volume.

2. The method according to claim 1, wherein said indicator is a binary flag.

3. A device of color mapping comprising at least a processor configured to:
    decode an indicator from a bitstream, said indicator indicates whether (1) a color mapping based on color mapping data is to be applied directly on a video signal represented in a first color volume or (2) said color mapping based on said color mapping data is to be applied on said video signal after a prior color mapping of said video signal from said first color volume into a second color volume different from said first color volume, and wherein said indicator further indicates said second color volume;
    color map said video signal by applying the color mapping data directly on the video signal in the case where said indicator indicates said color mapping based on said color mapping data is to be applied directly on the video signal represented in the first color volume; and otherwise
    color map said video signal by color mapping said video signal from said first color volume into said second color volume and by applying the color mapping data on the video signal represented in said second color volume.

4. The device according to claim 3, wherein said indicator is a binary flag.

5. A non-transitory computer-readable medium including instructions for causing one or more processors to perform:
    decoding an indicator from a bitstream, wherein said indicator indicates whether (1) a color mapping based on color mapping data is to be applied directly on a video signal represented in a first color volume or (2) said color mapping based on said color mapping data is to be applied on said video signal after a prior color mapping of said video signal from said first color volume into a second color volume different from said first color volume, and wherein said indicator further indicates said second color volume;
    color mapping said video signal by applying the color mapping data directly on the video signal in the case where said indicator indicates said color mapping based on said color mapping data is to be applied directly on the video signal represented in the first color volume; and otherwise
    color mapping said video signal by color mapping said video signal from said first color volume into said second color volume and by applying the color mapping data on the video signal represented in said second color volume.

6. The non-transitory computer-readable media according to claim 5, wherein said indicator is a binary flag.

* * * * *